United States Patent
Held et al.

(10) Patent No.: US 10,313,645 B1
(45) Date of Patent: Jun. 4, 2019

(54) VARIABLE EMISSION PERIOD FOR SCANNED-BEAM DISPLAY

(71) Applicant: Microsoft Technology Licensing, LLC, Redmond, WA (US)

(72) Inventors: Robert Thomas Held, Seattle, WA (US); Andrew Martin Pearson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/875,781

(22) Filed: Jan. 19, 2018

(51) Int. Cl.
| | | |
|---|---|---|
| *G02B 27/01* | (2006.01) | |
| *H04N 9/31* | (2006.01) | |
| *G02B 26/10* | (2006.01) | |

(52) U.S. Cl.
CPC ......... *H04N 9/3135* (2013.01); *G02B 26/105* (2013.01); *G02B 27/017* (2013.01); *G02B 27/0179* (2013.01); *H04N 9/3129* (2013.01); *G02B 2027/014* (2013.01); *G02B 2027/0123* (2013.01); *G02B 2027/0187* (2013.01); *G02B 2027/0198* (2013.01)

(58) Field of Classification Search
CPC .............. G02B 27/017; G02B 27/0172; G02B 27/0176; G02B 2027/014; G02B 2027/0174; G02B 2027/0178; H04N 9/3129; H04N 9/3132; H04N 9/3135
See application file for complete search history.

(56) References Cited

U.S. PATENT DOCUMENTS

| | | | | | |
|---|---|---|---|---|---|
| 9,188,846 | B2 * | 11/2015 | Imai | .................... | H04N 9/3129 |
| 9,230,473 | B2 * | 1/2016 | Margolis | .............. | G09G 3/3208 |
| 9,830,120 | B2 * | 11/2017 | Park | ......................... | G06F 3/14 |
| 9,860,522 | B2 * | 1/2018 | Lapstun | ............... | H04N 13/302 |
| 10,058,454 | B2 * | 8/2018 | Chayet | ..................... | H04N 3/08 |

(Continued)

FOREIGN PATENT DOCUMENTS

| | | |
|---|---|---|
| DE | 112016001524 T5 | 12/2017 |
| EP | 2639621 A1 | 9/2013 |

OTHER PUBLICATIONS

"International Search Report and Written Opinion Issued in PCT Application No. PCT/US2019/013119", dated Mar. 20, 2019, 15 pages.

*Primary Examiner* — Bao-Luan Q Le
(74) *Attorney, Agent, or Firm* — Alleman Hall Creasman & Tuttle LLP

(57) ABSTRACT

A scanned-beam display comprises an emitter configured to emit light of controlled variable intensity, a beam-steering optic configured to steer the light to a controlled variable beam position, and a drive circuit coupled operatively to the emitter and beam-steering optic. The drive circuit is configured to apply a signal to the beam-steering optic to move the beam position along a path of pixel positions, the path including a first pixel position at the center of the field-of-view and a second pixel position at the periphery of the field-of-view. The drive circuit is further configured to drive a series of current pulses through the emitter in synchronicity with the signal, to illuminate the first pixel position during a first interval and to equivalently illuminate the second pixel position during a second interval, the emitter being driven at a higher duty cycle during the second interval than during the first.

20 Claims, 7 Drawing Sheets

(56) References Cited

U.S. PATENT DOCUMENTS

| | | | |
|---|---|---|---|
| 2013/0286362 A1* | 10/2013 | Imai | H04N 9/3129 |
| | | | 353/85 |
| 2014/0104501 A1 | 4/2014 | Jackson | |
| 2014/0375679 A1* | 12/2014 | Margolis | G09G 3/3208 |
| | | | 345/633 |
| 2015/0238362 A1* | 8/2015 | Chayet | H04N 3/08 |
| | | | 348/63 |
| 2015/0347074 A1* | 12/2015 | Park | G06F 3/14 |
| | | | 348/565 |
| 2017/0214907 A1* | 7/2017 | Lapstun | H04N 13/302 |
| 2017/0332070 A1* | 11/2017 | Markovsky | H04N 13/341 |

* cited by examiner

VARIABLE EMISSION PERIOD FOR SCANNED-BEAM DISPLAY

BACKGROUND

A scanned-beam display forms a display image by rapidly scanning a modulated beam within an observer's field of view. The optoelectronic componentry used for scanned-beam display is compact, power-efficient, and can form images of arbitrary scale and aspect ratio. Nevertheless, scanned-beam display is an emerging technology, where various issues affecting image quality await resolution.

SUMMARY

One aspect of this disclosure is directed to a scanned-beam display configured to form a display image in a user's field-of-view. The scanned-beam display comprises an emitter configured to emit light of a controlled variable intensity, a beam-steering optic configured to receive and steer the light to a controlled variable beam position, and a drive circuit coupled operatively to the emitter and to the beam-steering optic. The drive circuit is configured to apply a control signal to the beam-steering optic to move the beam position along a path of pixel positions, the path including a first pixel position at the center of the field-of-view and a second pixel position at the periphery of the field-of view. The drive circuit is further configured to drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

This Summary is provided to introduce a selection of concepts in a simplified form that are further described below in the Detailed Description. This Summary is not intended to identify key features or essential features of the claimed subject matter, nor is it intended to limit the scope of the claimed subject matter. The claimed subject matter is also not limited to implementations that solve any disadvantages noted in any part of this disclosure.

DETAILED DESCRIPTION

Figure 1:
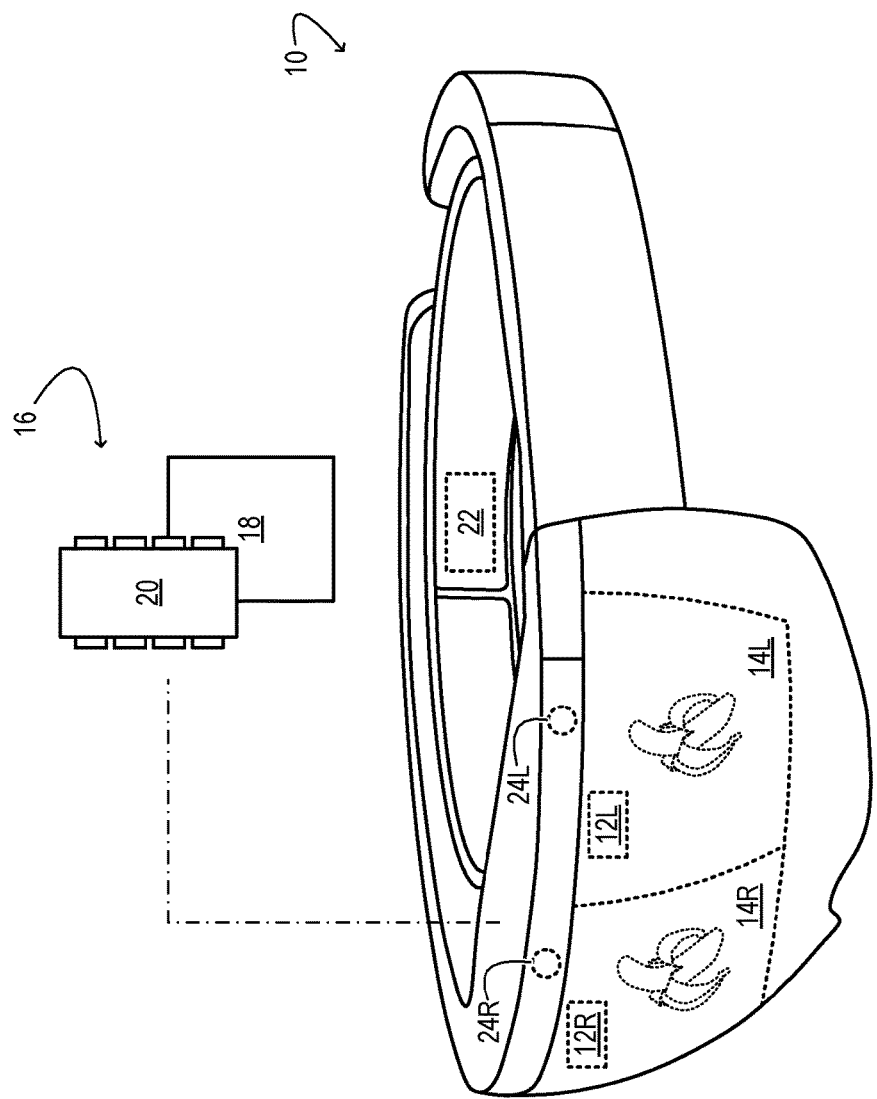
FIG. 1 shows aspects of an example near-eye display device.

This disclosure is presented by way of example, and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example near-eye display device 10. The illustrated display device is binocular; it employs a complementary pair of scanned-beam displays 12. Scanned-beam display 12R is configured to form a display image in display frame 14R, which is projected into the field-of-view (FOV) of the wearer's right eye. The display image may occupy the entire FOV or any portion thereof. Scanned-beam display 12L is configured to form a complementary display image in display frame 14L, which is projected into the FOV of the wearer's left eye. In other examples, a single scanned-beam display may be used for both eyes. Display device 10 includes an integrated computer system 16. Operatively coupled to the scanned-beam displays and to other device componentry, the computer system includes a logic system 18 and associated computer memory 20. The logic system and computer memory may be configured to render the display images provided to the scanned-beam displays, and to enact any processing and control function disclosed herein.

In some examples, the display images formed by right and left scanned-beam displays 12 are similar but not identical; they may exhibit a controlled positional disparity, so as to create a 3D stereo effect desirable for virtual-object display. In some examples, computer system 16 maintains a mapping of virtual display objects in real-world coordinates and adjusts the rendering of the objects based on the position and orientation of the wearer's head. To that end, near-eye display device 10 includes a sensor 22 with output responsive to the head position and/or rotation (e.g., an inertial, accelerometric, geomagnetic, and/or optical sensor). Optionally, near-eye display device 10 may also include one or more eye-imaging cameras 24—e.g., right eye-imaging camera 24R and left eye-imaging camera 24L. The eye-imaging cameras are configured to track the rotation of the wearer's pupil about its respective eye orbit, as described in further detail herein.

Figure 2:
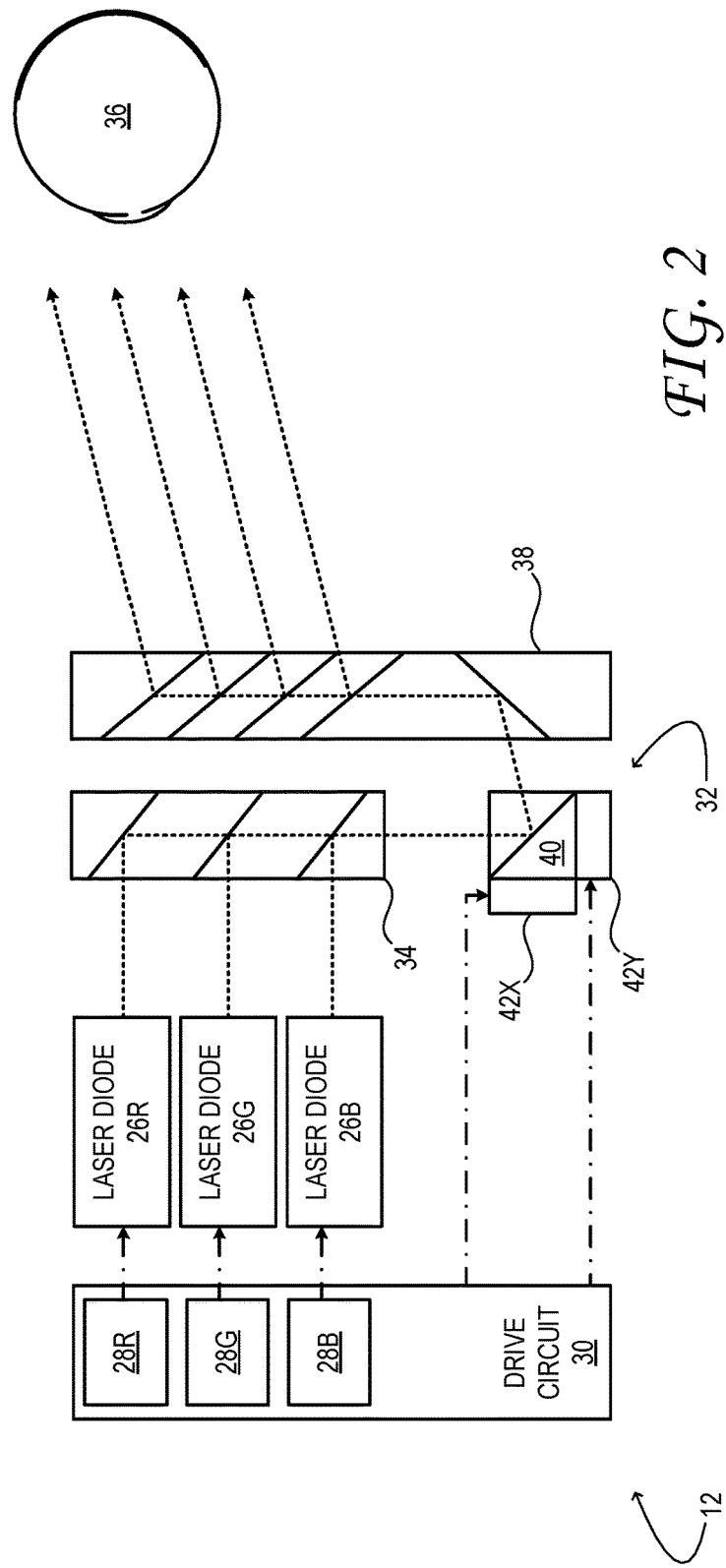
FIG. 2 shows aspects of an example scanned-beam display of a near-eye display device.

FIG. 2 shows aspects of an example scanned-beam display 12. Scanned-beam display 12 is a color display; it includes three different light emitters, each configured to emit light of a controlled variable intensity. In the illustrated embodiment, the emitters include a red-emitting laser diode 26R, a green-emitting laser diode 26G, and a blue-emitting laser diode 26B. A single emitter may be sufficient for monochrome image display. In general, each emitter supports a modulation scheme in which the intensity of the emitted light may be varied controllably on a timescale no greater than the refresh period of a single pixel of the display image. For instance, if the display image includes 720×480 pixels and is refreshed 60 times per second, then the response function of the emitter must be narrower than $1/720/480/60$ sec$^{-1}$, or 48 nanoseconds. A state-of-the-art laser diode may offer a suitably narrow response function, along with additional advantages of coherent, collinear, monochromatic emission, and high power output. In other examples, one or more incoherent light-emitting diode (LED) emitters may be used instead.

Continuing in FIG. 2, each laser diode 26 of scanned-beam display 12 is coupled operatively to an associated driver 28 that provides electrical bias to the laser diode pursuant to a control signal from computer system 16. In the illustrated example, drivers 28R, 28G, and 28B are incorporated into an integrated drive circuit 30 configured to provide shared timing among the drivers, and other control functions. The drivers and integrated drive circuit may include analog and/or digital componentry, including programmable (e.g., computer) componentry.

In scanned-beam display 12, a collimated beam from each laser diode 26 is received by beam-steering optic 32, through beam combiner 34. The beam-steering optic is configured to steer the laser emission to a controlled variable beam position. More particularly, the beam-steering optic is configured to redirect the combined beam along a moving axis that scans within (e.g., across and down) the FOV of the wearer's right or left pupil 36. To that end, drive circuit 30 modulates control of the beam-steering optic and synchronously modulates the current drawn through each of the laser diodes, such that the desired display imagery is formed in the FOV. In the illustrated example, the scanned beam passes through pupil-expansion optic 38 en route to the pupil. The pupil-expansion optic expands the beam to cover a larger area than the user's anatomical pupil, to prevent vignetting and other undesired effects that may otherwise result from misalignment of near-eye display device 10 on the wearer's face.

In the illustrated example, beam-steering optic 32 includes a microelectromechanical system (MEMS) mirror 40. The mirror is coupled mechanically to a pair of piezoelectric transducers 42. Transducer 42X controls the deflection of the mirror in a first direction; transducer 42Y controls the deflection of the mirror in a second direction, perpendicular to the first. Drive circuit 30 provides electrical bias to transducers 42 pursuant to a control signal from computer system 16. Through appropriate control of the transducers, mirror 40 is made to raster the combined beam within the wearer's FOV. As the beam position reaches a given pixel position (X, Y) in the FOV, the current applied to the red-, green- and blue-emitting laser diodes is adjusted so as to achieve the desired color and brightness for that pixel position. This control feature may be enacted continuously or periodically as the beam position scans through the FOV, or through a predetermined portion thereof. In this manner, the control signals provided to each laser diode 26 and transducer 42 define the display image formed in the FOV.

The skilled reader will appreciate that the term 'raster' is not meant to imply that the beam position necessarily scans a complete horizontal row of pixel positions before moving to an adjacent row. Rather, the control signal applied to transducers 42X and 42Y may be such as to achieve harmonic resonance in mirror 40. In traversing the FOV, the beams may trace out one or more complex trajectories (e.g., Lissajous figures). In tracing such trajectories, there is no expectation that either the beam position or physical component of the beam-steering system will travel at a constant speed. Provided, however, that the horizontal and vertical deflection of mirror 40 can be measured or predicted at any point in time, a display image may be formed by adjusting the current through each diode laser as a function of the deflection.

In some examples, beam-steering optic 32 may include a pair of single-axis mirrors or a micromirror array in lieu of mirror 40. In other examples, the beam-steering optic may include no mirror per se, but may include one or more transmissive or reflective elements having controllable diffractive properties. Suitable examples include tunable Bragg gratings and liquid-crystal embossed blazed gratings. By modulating the diffractive properties of such elements in real time, an emission beam may be scanned within the user's FOV.

Figure 3:
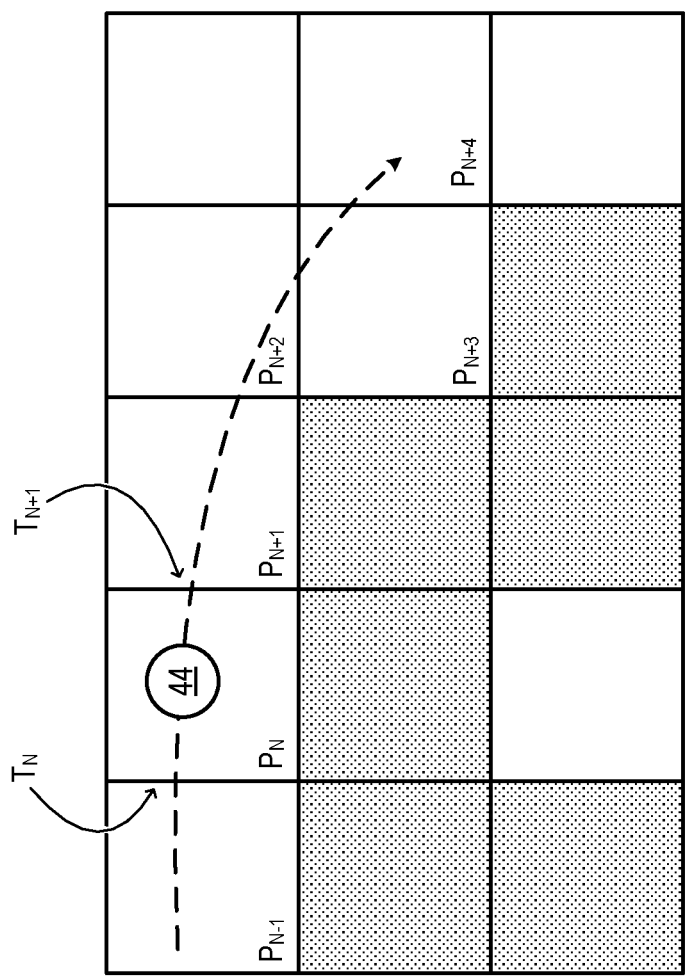
FIG. 3 shows aspects of an example pixel map associated with operation of a scanned-beam display.

FIG. 3 shows aspects of an example pixel map to illustrate the manner in which emission from laser diodes 26 may be synchronized to the beam deflection effected by beam-steering optic 32. In the illustrated example, drive circuit 30 applies a control signal to the beam-steering optic to move beam position 44 along a path of pixel positions. Here, the beam position crosses the left boundary of pixel $P_N$ at time $T_N$. The emission intensities of the red-, green-, and blue-emitting laser diodes are then adjusted so as to achieve the required brightness and color mixture for pixel $P_N$ in the current display frame from time $T_N$ until time $T_{N+1}$. At time $T_{N+1}$, the beam position exits the right boundary of pixel $P_N$ and crosses into pixel $P_{N+1}$. Now the emission intensities are readjusted to achieve the required brightness and color mixture for pixel $P_{N+1}$. Intensity adjustment continues for each pixel that the beam position intersects, and through each successive display frame.

In general, the luminous emission required of a given laser diode 26 to illuminate pixel $P_N$ may be provided in the form of continuously varying, stair-step, or pulsed optical emission of appropriate integrated power. The emission profile may be as wide as the time window $\Delta T = T_{N+1} - T_N$, when beam position 44 is within the boundaries of pixel $P_N$. In general, $\Delta T$ is shortest for pixels near the center of the display frame, where the velocity of the beam position is greatest, and lower near the periphery of the display frame, where the beam position changes direction. As disclosed in further detail herein, an emission pulse train suitable to illuminate a path of pixel positions may be driven via a series of current pulses or other excitations from drive circuit 30. The term 'excitation' is used herein to describe the current waveform applied within a time window of a given pixel position to illuminate that pixel position. The current pulses or excitations are driven through the laser diode in synchronicity with the control signal applied to beam-steering optic 32.

Figure 4:
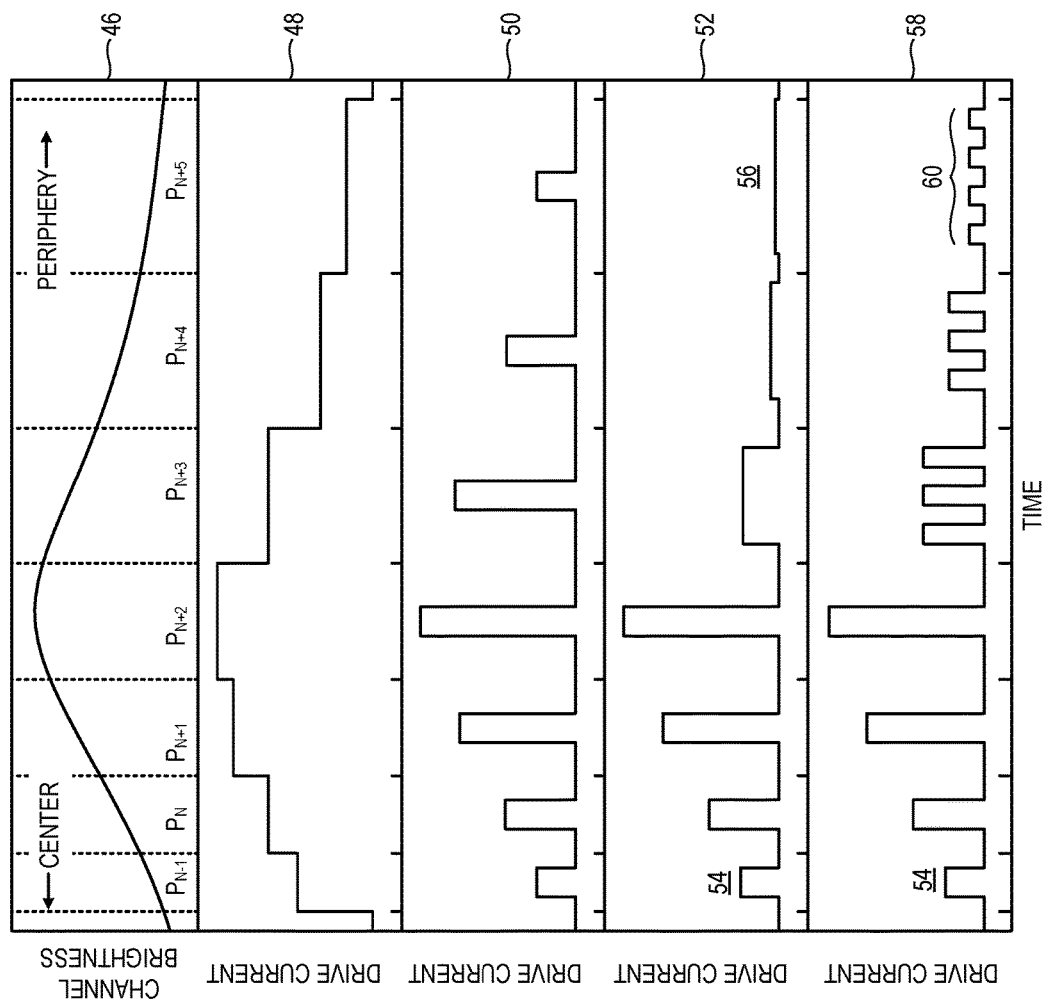
FIG. 4 illustrates various example biasing modes of a laser-diode emitter of a scanned-beam display.

FIG. 4 illustrates various modes of biasing a laser diode 26 to illuminate a path of pixel positions. Plot 46 of FIG. 4 is a plot of desired channel brightness (R, G, or B brightness, for example) versus time as beam position 44 travels along the path. For ease of illustration, the desired brightness is shown as an analog waveform. In practice, the brightness may be a stair-step digital waveform of any suitable amplitude and temporal resolution. The dashed vertical lines in plot 46 delimit the time windows in which the beam position intersects consecutive pixel positions $P_{N-1}$, $P_N$, $P_{N+1}$, etc. In this example, the pixel position at the left of the plot lies at the center of the user's FOV, and the pixel position at the right of the plot lies at the periphery of the user's FOV. In a high-resolution display, hundreds of pixel positions may separate the central and peripheral portions of the user's FOV; for ease of illustration, FIG. 4 shows only seven pixel positions in this range. In the illustrated scenario, the average channel brightness varies along the path of pixel positions, reaching a maximum value at $P_{N+2}$. The brightness is the same for pixel positions $P_{N-1}$ and $P_{N+5}$, averaged over their respective time windows, but the time window for peripheral pixel position $P_{N+5}$ is much longer than the time window for central pixel position $P_{N-1}$. This may be due, for example, to harmonic oscillation of mirror 40, which causes the horizontal and vertical components of the velocity of beam position 44 to change continuously. It will be noted that beam-steering optics other than harmonically driven mirrors may also exhibit this property (vide infra).

Figure 5:
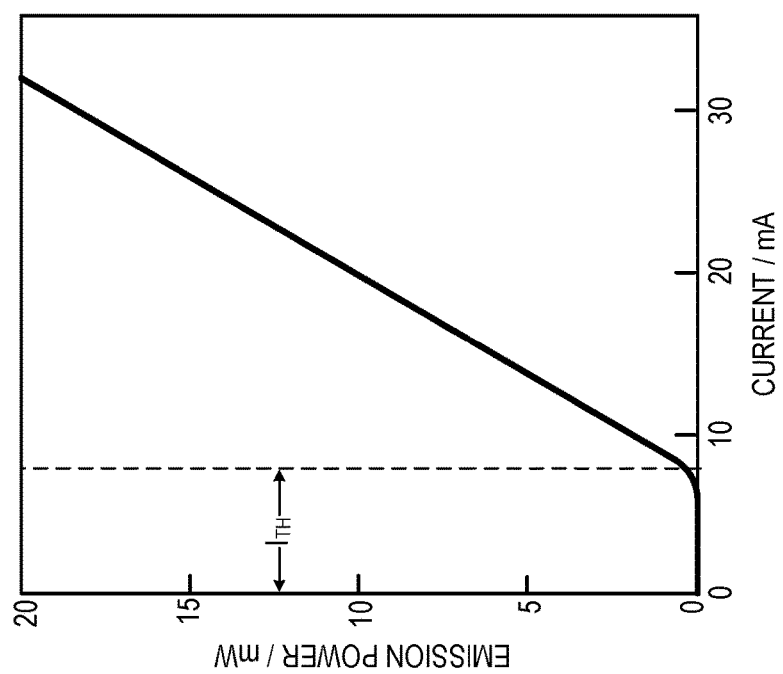
FIG. 5 is a plot of emission power versus drive current for an example laser diode.

Plot 48 of FIG. 4 illustrates an example biasing mode in which laser diode 26 is made to emit within the entire time window ΔT of each pixel position. To achieve this result, the laser diode is driven at a duty cycle of 100%. In one example, the emission current is stepped at the beginning of the time window to a level proportional to the desired pixel brightness and inversely proportional to the length of the time window, and maintained at that level for the duration of the time window. In this and subsequent plots in FIG. 4, the area under the drive current excitation for a given pixel position is proportional to the desired channel brightness of that pixel position, when integrated over the corresponding time window. The term 'duty cycle' is used herein to express the fraction or percentage of an operating time interval of a system (e.g., the scanned-beam display) in which a component of that system (e.g., the laser diode) is turned on. For instance, the duty cycle would be 100% if the laser diode were turned on for the entire operating interval, 0% if it were turned off for the entire operating interval, and 50% if it were on for half of the operating interval and off for the other half, irrespective of the number of on-off transitions within the operating interval. Turning briefly to FIG. 5, the threshold current $I_{TH}$ of a laser diode is the drive current I that must be exceeded for any stimulated emission to be observed. At drive currents below $I_{TH}$, charge carriers recombine non-radiatively at a rate that exceeds the rate of accumulation. The minimum drive current value in plot 48, ff., of FIG. 4 corresponds to the threshold current $I_{TH}$ in the illustrated examples. In other examples, the drive current between pulses may be reduced below $I_{TH}$ (e.g., to zero), in order to conserve power.

Continuing now in FIG. 4, the biasing mode of plot 48 admits of certain disadvantages. First, as the skilled reader will understand, a laser diode may be subject to a turn-on delay due to the time required to accumulate an inverted charge-carrier population within the laser cavity. Accordingly, there may be scenarios where it is not possible for emission at pixel position $P_N$ to cover the entire time window ΔT—e.g., at high resolution (short ΔT), when pixel $P_{N-1}$ must be dark. Although a laser diode may be primed below $I_{TH}$ to shorten or eliminate the turn-on delay, this tactic may erode power efficiency, especially if applied at every pixel.

Another disadvantage of maintaining emission over the entire ΔT window is that such emission may be perceived as 'motion blur' by an observer whose eyes are tracking a moving display object. As the observer tracks the object, the pupil revolves about the eye orbit, causing light from long-illuminated pixel positions to activate an elongated path of receptors on the retina. This the observer may perceive as blur affecting the moving object. Furthermore, in embodiments in which scanned-beam display 12 is operated in a color-sequential mode, even small amounts of motion blur may be manifest in the form of color break-up. Fortunately, in most viewing scenarios, motion blur and related effects are usually observed only in the central portion of the observer's FOV, because this is the region in which a human being usually tracks a moving object.

To address the issues of turn-on delay and motion blur, the biasing mode of plot 50 may be used. Here, an excitation in the form of a single, narrow pulse is scheduled at the center of the ΔT window for each pixel position. The laser diode in this example is driven at a duty cycle significantly less than 100%. This approach not only overcomes the issues of turn-on delay and motion blur, but may also provide improved power efficiency in some scenarios—e.g., when sub-threshold priming current is suspended between pulses.

Despite the above benefits, the biasing mode of plot 50 also admits of certain disadvantages. In plot 50, the duty cycle of emission of the laser diode within a given time window may be 20% or less. The short duty cycle of emission may cause, for the user, a sensation of 'flicker' in some viewing scenarios. In general, flicker is most noticeable at the periphery of the observer's FOV, where display pixels are imaged away from the fovea. The peripheral portion of the retina supports a high density of rods, which are generally very sensitive to motion. Flicker is least noticeable at the center of the FOV, where display pixels are imaged directly onto the fovea. The fovea supports a high density of cones, with lower sensitivity to motion, and comparatively fewer rods.

Continuing in FIG. 4, plot 52 illustrates a hybrid biasing mode configured to illuminate the same path of pixels over the same time windows as indicated above. In plot 52, the laser diode is driven at a low duty cycle for pixels at and near the center of the user's FOV, and at a higher duty cycle for pixels at the periphery of the FOV, even when the central and peripheral pixel positions are illuminated to the same channel brightness. (Note that the same channel brightness is indicated for pixel positions $P_{N-1}$ and $P_{N+5}$ in plot 46.) The high duty cycle at the periphery of the FOV protects against flicker, but is unlikely to cause noticeable motion blur, because a user is less likely to track an object in this region. Conversely, the low duty cycle at the center of the FOV prevents motion blur, and is unlikely in this region to be perceived as flicker, because of the lower rod density of the fovea.

In the example illustrated in plot 52, the series of current pulses applied to the laser diode includes an excitation 54 of base (e.g., nominal) duration within the $P_{N-1}$ interval and an excitation 56, longer than the base duration, within the $P_{N+5}$ interval. In this example, excitations 54 and 56 each comprise a singular current pulse. In the illustrated example, excitation 56 fills the time window of the corresponding peripheral pixel position, for a duty cycle of 100%. This aspect, however, is not strictly necessary. In some examples, the duty cycle may vary (in any increment) from a low value at the center of the FOV to a high value at the periphery. In other words, a duration of excitation 56 may be lengthened with increasing distance from the center of the FOV.

Plot 58 illustrates a biasing mode related to that of plot 52. As in the previous example, excitation 54 of base duration comprises a singular current pulse within the $P_{N-1}$ interval. However, excitation 56 of the previous example is now replaced by an excitation 60 comprising a series of current pulses, with a duty cycle of about 50%. Naturally the biasing modes of plots 52 and 58 may be combined in various ways. For instance, a duration of at least one of the plurality of current pulses in excitation 60 may be lengthened with increasing distance from the center of the FOV. Alternatively, or in addition, a number of pulses included in the plurality of current pulses may increase with increasing distance from the center of the FOV.

In these and other examples, drive circuit 30 is further configured to vary the amplitude of each excitation (or current pulse therein) so as to impart a predetermined integrated emission intensity to each pixel position along the path of beam position 44. The predetermined integrated emission intensity corresponds, naturally, to the desired channel brightness, and may be achieved in a variety of ways. In some examples, all pulses of a given excitation (when plural pulses are used) may have the same amplitude. In other examples, the pulse amplitude may be varied within an excitation.

As noted above, the dashed lines and tick marks on the horizontal axes of FIG. 4 delimit the pixel position across the user's FOV, from the center to the periphery. Operationally, this pixel position may be related to the horizontal and/or vertical pixel offsets of the right or left display frame 14 of near-eye display device 10. For example, each eye-imaging camera 24 of the near-eye display device may provide output responsive to the rotation of the imaged pupil within its respective eye orbit. Logic in computer system 16 may be configured to receive this data and compute a mapping to relate each portion of the FOV to a corresponding portion of the display frame. In this manner, the horizontal coordinate shown in FIG. 4 may be mapped to a pixel offset relative to the display frame, based on the observed pupil rotation, or gaze angle. In other embodiments, eye tracking and explicit pixel mapping be omitted, as it may be assumed that the center of the user's FOV coincides with the center of the display frame, and the edges of the user's FOV correspond to the respective edges of the display frame. This assumption is based on a user's natural tendency to turn his or her head to directly face an object of interest.

In scenarios where it may be assumed that the center of the user's FOV coincides with the center of the display frame, the advantages of the biasing modes of plots 52 and 58 are only amplified. In particular, even a narrow pulse near the center a display frame may provide a significant duty cycle, unlikely to cause flicker, because the beam velocity is so great in this region. Conversely, the problem of flicker due to single, narrow pulses is especially worrisome at the periphery of a display frame, where the beam velocity is slowest and the time window widest.

Figure 6:
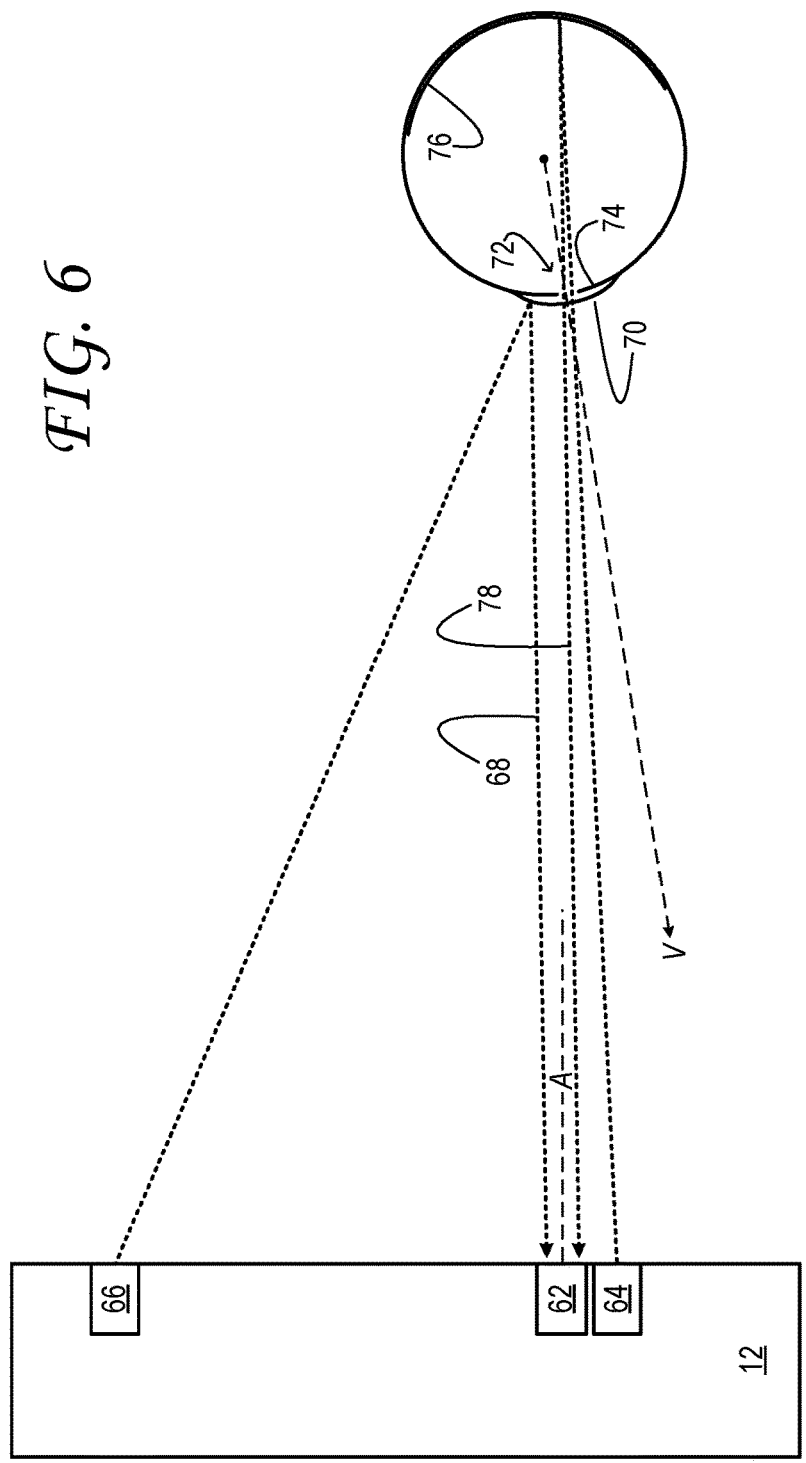
FIG. 6 illustrates aspects gaze tracking in an example near-eye display device.

FIG. 6 is provided in order to illustrate an example mode of tracking the pupil rotation of a near-eye display device wearer. The principles disclosed herein are equally applicable, however, to gaze tracking using remote camera systems. The configuration illustrated in FIG. 6 includes, for each of the right and left scanned-beam displays 12, a camera 62, an on-axis lamp 64 and an off-axis lamp 66. Each lamp may comprise a light-emitting diode (LED) or diode laser, for example, which emits infrared (IR) or near-infrared (NIR) illumination in a high-sensitivity wavelength band of the camera.

The terms 'on-axis' and 'off-axis' refer to the direction of illumination of the eye with respect to the optical axis A of camera 62. As shown in FIG. 6, off-axis illumination may create a specular glint 68 that reflects from the viewer's cornea 70. Off-axis illumination may also be used to illuminate the eye for a 'dark pupil' effect, where pupil 72 appears darker than the surrounding iris 74. By contrast, on-axis illumination from an IR or NIR source may be used to create a 'bright pupil' effect, where the pupil appears brighter than the surrounding iris. More specifically, IR or NIR illumination from on-axis lamp 64 may illuminate the retroreflective tissue of the retina 76, which reflects the illumination back through the pupil, forming a bright image 78 of the pupil. Image data from the camera is conveyed to associated logic in computer system 16. There, the image data may be processed to resolve such features as one or more glints from the cornea, or the pupil outline. The locations of such features in the image data may be used as input parameters in a model—e.g., a polynomial model—that relates feature position to the apparent center of the pupil. Despite the advantages of eye-imaging to determine pupil rotation, this metric may be determined, estimated, or predicted in various other ways. Near-eye display device 10 may include one or more electrooculographic sensors, for example.

More generally, no aspect of the above description should be interpreted in a limiting sense, for numerous variations, extensions, and omissions are also envisaged. It was indicated, for instance, that one reason for the unequal time windows of the various pixel positions of the scanned-beam display is that a beam guided by a harmonically resonant mirror will pass more quickly over each pixel in the center of the FOV than over each pixel of the periphery. A compounding issue for any planar grid of equal-size pixels, illuminated one at a time for a fixed amount of time, is that images displayed on such a plane will 'consume' more pixels at the periphery than at center, for each angular unit of FOV. For example, the spatial content of 10 horizontal pixels at the center of the FOV may require 15 pixels at the periphery. Therefore, even if it were possible to provide to raster the beam position like that of a CRT screen, display content at the periphery would still require more time to write than equivalent content at the center.

Figure 7:
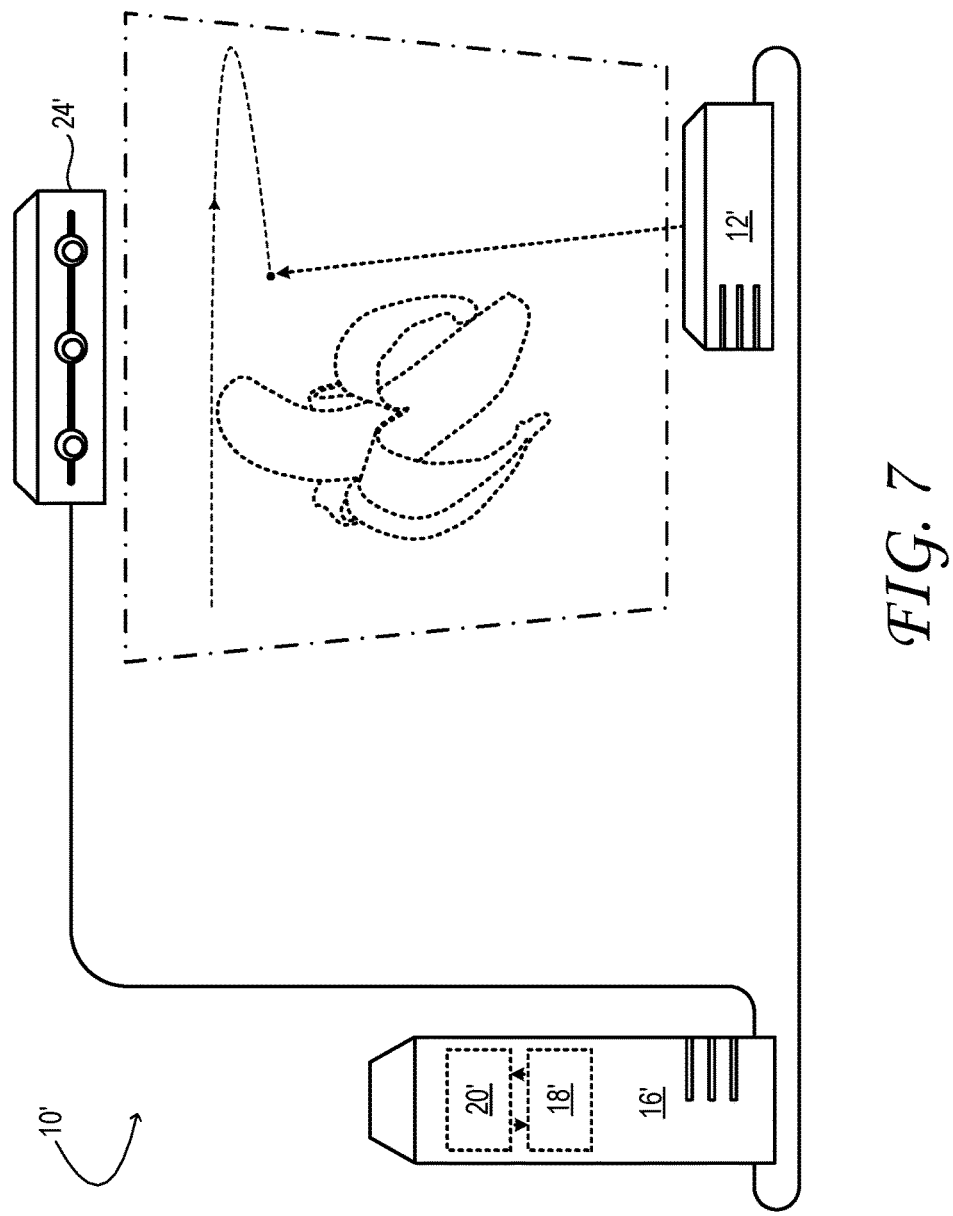
FIG. 7 shows aspects of an example display-image projector and remote camera system.

Furthermore, the scanned-beam biasing modes disclosed herein are not limited to near-eye display systems, but are equally applicable to display projectors of various scales and form factors. FIG. 7 shows, by way of example, aspects of a front-projection system 10' including a scanned-beam projector 12' and remote computer system 16'. The system also includes an eye-imaging sensor in the form of a remote camera 24', which is operatively coupled to the scanned-beam display via the remote computer.

One aspect of this disclosure is directed to a scanned-beam display configured to form a display image in a field-of-view of a user. The scanned-beam display comprises: an emitter configured to emit light of a controlled variable intensity; a beam-steering optic configured to receive and steer the light to a controlled variable beam position; and coupled operatively to the emitter and to the beam-steering optic, a drive circuit configured to: apply a control signal to the beam-steering optic to move the beam position along a path of pixel positions, the path including a first pixel position at a center of the field-of-view and a second pixel position at a periphery of the field-of view, and drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

In some implementations, the first interval is an interval over which the beam position intersects the first pixel position, and the second interval is an interval over which the beam position intersects the second pixel position. In some implementations, the series of current pulses includes an excitation of base duration within the first interval and an excitation longer than the base duration within the second interval. In some implementations, the excitation of base duration comprises a singular current pulse. In some implementations, the excitation longer than the base duration comprises a singular current pulse. In some implementations, the excitation longer than the base duration comprises a plurality of current pulses. In some implementations, a duration of at least one of the plurality of current pulses is lengthened with increasing distance from the first pixel position. In some implementations, a number of pulses included in the plurality of current pulses increases with increasing distance from the first pixel position. In some implementations, the beam-steering optic includes a mirror mechanically coupled to a transducer, and the control signal is applied to the transducer. In some implementations, the drive circuit is further configured to vary an amplitude of the series of current pulses so as to impart predetermined brightness to the first and second pixel positions. In some implementations, the emitter is a laser diode. In some implementations, the emitter is one of a plurality of emitters configured to emit light, and the beam-steering optic is configured to receive and steer the light from each of the plurality of emitters. In some implementations, the scanned-beam display further comprises: a sensor providing an output responsive to a head rotation of the user; and logic configured to adjust a rendering of the display image based on the output. In some implementations, the scanned-beam display further comprises: a sensor providing an output responsive to displacement of the field-of-view relative to a display frame of the scanned-beam display device; and logic coupled operatively to the sensor and configured to relate each portion of the field of view to a corresponding portion of the display frame. In some implementations, the scanned-beam display is arranged in a near-eye display device.

Another aspect of this disclosure is directed to a scanned-beam display configured to form a display image within a display frame. The scanned-beam display comprises: an emitter configured to emit light of a controlled variable intensity; a beam-steering optic configured to receive and steer the light to a controlled variable beam position; and coupled operatively to the emitter and to the beam-steering optic, a drive circuit configured to: apply a control signal to the beam-steering optic to move the beam position along a path of pixel positions, the path including a first pixel position at a center of the display frame and a second pixel position at a periphery of the display frame, and drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

In some implementations, the first interval is an interval over which the beam position intersects the first pixel position, the second interval is an interval over which the beam position intersects the second pixel position, and the series of current pulses includes an excitation of base duration within the first interval and an excitation longer than the base duration within the second interval.

Another aspect of this disclosure is directed to a scanned-beam display system configured to form a display image in a field-of-view of a user. The scanned-beam display system comprises: a sensor providing an output responsive to displacement of the field-of-view relative to a display frame of the scanned-beam display device; logic coupled operatively to the sensor and configured to relate each portion of the field of view to a corresponding portion of the display frame; an emitter configured to emit light of a controlled variable intensity; a beam-steering optic configured to receive and steer the light to a controlled variable beam position; and coupled operatively to the emitter and to the beam-steering optic, a drive circuit configured to: apply a control signal to the beam-steering optic to move the beam position along a path of pixel positions, the path including a first pixel position at a center of the field of view and a second pixel position at a periphery of the field-of view, and drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

In some implementations, the sensor includes a camera configured to image an eye of the user. In some implementations, the sensor includes a remote camera.

It will be understood that the configurations and approaches described herein are exemplary in nature, and that these specific implementations or examples are not to be taken in a limiting sense, because numerous variations are feasible. The specific routines or methods described herein may represent one or more processing strategies. As such, various acts shown or described may be performed in the sequence shown or described, in other sequences, in parallel, or omitted.

The subject matter of this disclosure includes all novel and non-obvious combinations and sub-combinations of the various processes, systems and configurations, and other features, functions, acts, and/or properties disclosed herein, as well as any and all equivalents thereof.

The invention claimed is:

1. A scanned-beam display configured to form a display image in a field-of-view of a user, the scanned-beam display comprising:
an emitter configured to emit light of a controlled variable intensity;
a beam-steering optic configured to receive and steer the light to a controlled variable beam position; and
coupled operatively to the emitter and to the beam-steering optic, a drive circuit configured to:
apply a control signal to the beam-steering optic to move the beam position along a path of pixel positions, the path including a first pixel position at a center of the field-of-view and a second pixel position at a periphery of the field-of view, and
drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

2. The scanned-beam display of claim 1 wherein the first interval is an interval over which the beam position intersects the first pixel position, and the second interval is an interval over which the beam position intersects the second pixel position.

3. The scanned-beam display of claim 1 wherein the series of current pulses includes an excitation of base duration within the first interval and an excitation longer than the base duration within the second interval.

4. The scanned-beam display of claim 3 wherein the excitation of base duration comprises a singular current pulse.

5. The scanned-beam display of claim 3 wherein the excitation longer than the base duration comprises a singular current pulse.

6. The scanned-beam display of claim 3 wherein the excitation longer than the base duration comprises a plurality of current pulses.

7. The scanned-beam display of claim 6 wherein a duration of at least one of the plurality of current pulses is lengthened with increasing distance from the first pixel position.

8. The scanned-beam display of claim 6 wherein a number of pulses included in the plurality of current pulses increases with increasing distance from the first pixel position.

9. The scanned-beam display of claim 1 wherein the beam-steering optic includes a mirror mechanically coupled to a transducer, and wherein the control signal is applied to the transducer.

10. The scanned-beam display of claim 1 wherein the drive circuit is further configured to vary an amplitude of the series of current pulses so as to impart predetermined brightness to the first and second pixel positions.

11. The scanned-beam display of claim 1 wherein the emitter is a laser diode.

12. The scanned-beam display of claim 1 wherein the emitter is one of a plurality of emitters configured to emit light, and wherein the beam-steering optic is configured to receive and steer the light from each of the plurality of emitters.

13. The scanned-beam display of claim 1 further comprising: a sensor providing an output responsive to a head rotation of the user; and logic configured to adjust a rendering of the display image based on the output.

14. The scanned-beam display of claim 1 further comprising: a sensor providing an output responsive to displacement of the field-of-view relative to a display frame of the scanned-beam display device; and logic coupled operatively to the sensor and configured to relate each portion of the field of view to a corresponding portion of the display frame.

15. The scanned-beam display of claim 1 wherein the scanned-beam display is arranged in a near-eye display device.

16. A scanned-beam display configured to form a display image within a display frame, the scanned-beam display comprising:
    an emitter configured to emit light of a controlled variable intensity;
    a beam-steering optic configured to receive and steer the light to a controlled variable beam position; and
    coupled operatively to the emitter and to the beam-steering optic, a drive circuit configured to:
        apply a control signal to the beam-steering optic to move the beam position along a path of pixel positions, the path including a first pixel position at a center of the display frame and a second pixel position at a periphery of the display frame, and
        drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

17. The scanned-beam display of claim 16 wherein the first interval is an interval over which the beam position intersects the first pixel position, the second interval is an interval over which the beam position intersects the second pixel position, and wherein the series of current pulses includes an excitation of base duration within the first interval and an excitation longer than the base duration within the second interval.

18. A scanned-beam display system configured to form a display image in a field-of-view of a user, the scanned-beam display system comprising:
    a sensor providing an output responsive to displacement of the field-of-view relative to a display frame of the scanned-beam display device;
    logic coupled operatively to the sensor and configured to relate each portion of the field of view to a corresponding portion of the display frame;
    an emitter configured to emit light of a controlled variable intensity;
    a beam-steering optic configured to receive and steer the light to a controlled variable beam position; and
    coupled operatively to the emitter and to the beam-steering optic, a drive circuit configured to:
        apply a control signal to the beam-steering optic to move the beam position along a path of pixel positions, the path including a first pixel position at a center of the field of view and a second pixel position at a periphery of the field-of view, and
        drive a series of current pulses through the emitter in synchronicity with the control signal, to illuminate the first pixel position during a first interval and to equivalently illuminate the second pixel position during a second interval, the emitter being driven at a higher duty cycle during the second interval than during the first interval.

19. The scanned-beam display system of claim 18 wherein the sensor includes a camera configured to image an eye of the user.

20. The scanned-beam display system of claim 18 wherein the sensor includes a remote camera.

\* \* \* \* \*